(12) United States Patent
Ishihara et al.

(10) Patent No.: US 10,228,281 B2
(45) Date of Patent: Mar. 12, 2019

(54) OPTICAL SENSOR AND MANUFACTURING METHOD FOR THE SAME

(71) Applicant: DENSO CORPORATION, Kariya, Aichi-pref. (JP)

(72) Inventors: Jun Ishihara, Kariya (JP); Takamitsu Ookura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/540,360

(22) PCT Filed: Jan. 28, 2016

(86) PCT No.: PCT/JP2016/000438
§ 371 (c)(1),
(2) Date: Jun. 28, 2017

(87) PCT Pub. No.: WO2016/125470
PCT Pub. Date: Aug. 11, 2016

(65) Prior Publication Data
US 2017/0363466 A1    Dec. 21, 2017

(30) Foreign Application Priority Data
Feb. 4, 2015  (JP) ................................. 2015-020162

(51) Int. Cl.
*B60Q 1/08*  (2006.01)
*B60Q 1/30*  (2006.01)
(Continued)

(52) U.S. Cl.
CPC ............... *G01J 1/44* (2013.01); *B60Q 1/085* (2013.01); *G01J 1/02* (2013.01); *G01J 1/06* (2013.01);
(Continued)

(58) Field of Classification Search
CPC ..................................... B60S 1/0833–1/0844
See application file for complete search history.

(56) References Cited

U.S. PATENT DOCUMENTS 6,376,824 B1 * 4/2002 Michenfelder ...... B60Q 1/1423
250/214 R
2009/0230313 A1  9/2009 Chiba
(Continued)

FOREIGN PATENT DOCUMENTS

| JP | 2008-39417 A | 2/2008 | |
|---|---|---|---|
| JP | WO 2013157258 A1 * | 10/2013 | ............ B60S 1/0833 |
| JP | 2014-21014 A | 2/2014 | |

*Primary Examiner* — Shawn Decenzo
(74) *Attorney, Agent, or Firm* — Posz Law Group, PLC

(57) ABSTRACT

In an optical sensor, a detecting part includes detecting elements, and a light-shielding portion providing directional characteristics of light to the detecting elements such that the detecting elements indicate different intensities of light received in a specified direction. A signal processing part has an adjustment value for processing detection signals. The adjustment value is set as follows. Based on information of an inclination angle of a window glass of a vehicle to which the detecting part is attached, from the detecting elements, a detecting element having a directional characteristic of light suitable for the inclination angle is selected. The adjustment value is then set so as to coincide a signal value of a detection signal of the selected detecting element with a target value, when the detecting part is irradiated with light in a predetermined direction in a state where the detecting part is inclined at the inclination angle.

6 Claims, 6 Drawing Sheets

(51) Int. Cl.
  *G01J 1/02* (2006.01)
  *G01J 1/06* (2006.01)
  *G01J 1/44* (2006.01)

(52) U.S. Cl.
  CPC .......... *B60Q 1/30* (2013.01); *B60Q 2300/312* (2013.01); *B60Q 2300/337* (2013.01)

(56) References Cited

U.S. PATENT DOCUMENTS

2013/0037700 A1    2/2013  Michiyama et al.
2015/0062569 A1*   3/2015  Sugiura ................ B60S 1/0833
                                                356/139.1

* cited by examiner

|   | A1 | A2 | B1 | B2 | C | D |
|---|---|---|---|---|---|---|
| (1) ANGLE OF ELEVATION 40° AZIMUTH 0° | A1(1) | A2(1) | B1(1) | B2(1) | C(1) | D(1) |
| (2) ANGLE OF ELEVATION 40° AZIMUTH +90° | A1(2) | A2(2) | B1(2) | B2(2) | C(2) | D(2) |
| (3) ANGLE OF ELEVATION 40° AZIMUTH −90° | A1(3) | A2(3) | B1(3) | B2(3) | C(3) | D(3) |

OPTICAL SENSOR AND MANUFACTURING METHOD FOR THE SAME

CROSS REFERENCE TO RELATED APPLICATIONS

This application is a U.S. national stage of International Patent Application No. PCT/JP2016/000438 filed on Jan. 28, 2016 and is based on Japanese Patent Application No. 2015-20162 filed on Feb. 4, 2015, the disclosures of which are incorporated herein by reference.

TECHNICAL FIELD

The present disclosure relates to an optical sensor to be mounted on a vehicle, and a manufacturing method for the optical sensor.

BACKGROUND ART

For example, a patent literature 1 has proposed an optical sensor having a semiconductor substrate formed with a plurality of light receiving elements. The optical sensor has a light-shielding portion above the semiconductor substrate. The light-shielding portion has a plurality of light-leading portions correspondingly provided for the light-receiving elements.

The light-leading portions are provided in the light-shielding portion such that the angles of light incident on the light-receiving elements are different from each other. Thus, the respective light-receiving elements have directional characteristics with respect to the incident direction of the light. That is, in the optical sensor, the directional characteristics of light are provided beforehand to have a highest light-receiving intensity in a specified direction.

PRIOR ART LITERATURE

Patent Literature

Patent Literature 1: JP 2014-21014 A

SUMMARY OF INVENTION

In the technique as described above, however, the directional characteristics of light are not provided considering various inclination angles of window glasses. Therefore, in a case where the optical sensor is attached to a window glass of a vehicle when in use, it is difficult to obtain an output suitable for the angle of inclination of the window glass to which the optical sensor is attached. In other words, even if the direction of light applied to the optical sensor is the same, the output of the optical sensor varies depending on the inclination angle of the window glass to which the optical sensor is attached.

It is a first object of the present disclosure to provide an optical sensor that is capable of being used for window glasses having various inclination angles. It is a second object of the present disclosure to provide a method for manufacturing the optical sensor.

According to a first aspect of the preset disclosure, an optical sensor has a detection unit that includes a plurality of detecting elements and a light-shielding portion. The detecting elements are disposed in a semiconductor substrate. Each of the detecting elements outputs an intensity of light received as a detection signal. The light-shielding portion provides directional characteristics of light to the plurality of detecting elements such that the intensity of light received in a specified direction is different between the plurality of detecting elements.

The optical sensor further includes a signal processing unit that receives the detection signals from the detecting part, and processes the detection signals using an adjustment value that is set beforehand.

The adjustment value is set as follows. Based on information of an inclination angle of a window glass of a vehicle to which the detecting part is attached, a detecting element having a directional characteristic of light suitable for the inclination angle is selected from the plurality of detecting elements. Then, the adjustment value is adjusted so as to coincide a signal value of a detection signal of the selected detecting element with a target value when the detecting part is irradiated with light in a predetermined direction in a state where the detecting part is inclined at the inclination angle.

The signal processing part processes, of the detection signals received from the detecting part, the detection signal of the selected detecting element using the adjustment value.

According to a second aspect of the present embodiment, a method for manufacturing an optical sensor includes: obtaining information of an inclination angle of a window glass of a vehicle to which a detecting part is attached; and selecting a detecting element suitable for the inclination angle from a plurality of detecting elements based on the information of the inclination angle.

The method for manufacturing the optical sensor further includes: setting an adjustment value so as to coincide a signal value of a detection signal of the detecting element selected by the selecting with a target value when the detecting part is irradiated with light in a predetermined direction in a state where the detecting part is inclined at the inclination angle; and storing information of the detecting element selected by the selecting and the adjustment value obtained by the setting to a signal processing part.

In this case, since the plurality of detecting elements are provided with different directional characteristics of light by the light-shielding part, the detection signal of the detecting element suitable for the inclination angle can be selectively used based on the information of the inclination angle of the window glass. That is, the directional characteristics of light suitable for the inclination angle of the window glass can be set in the detecting part. Further, the adjustment value can be adjusted based on the information of the inclination angle of the window glass. Therefore, the optical sensor that can be used for window glasses having various inclination angles is implemented.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
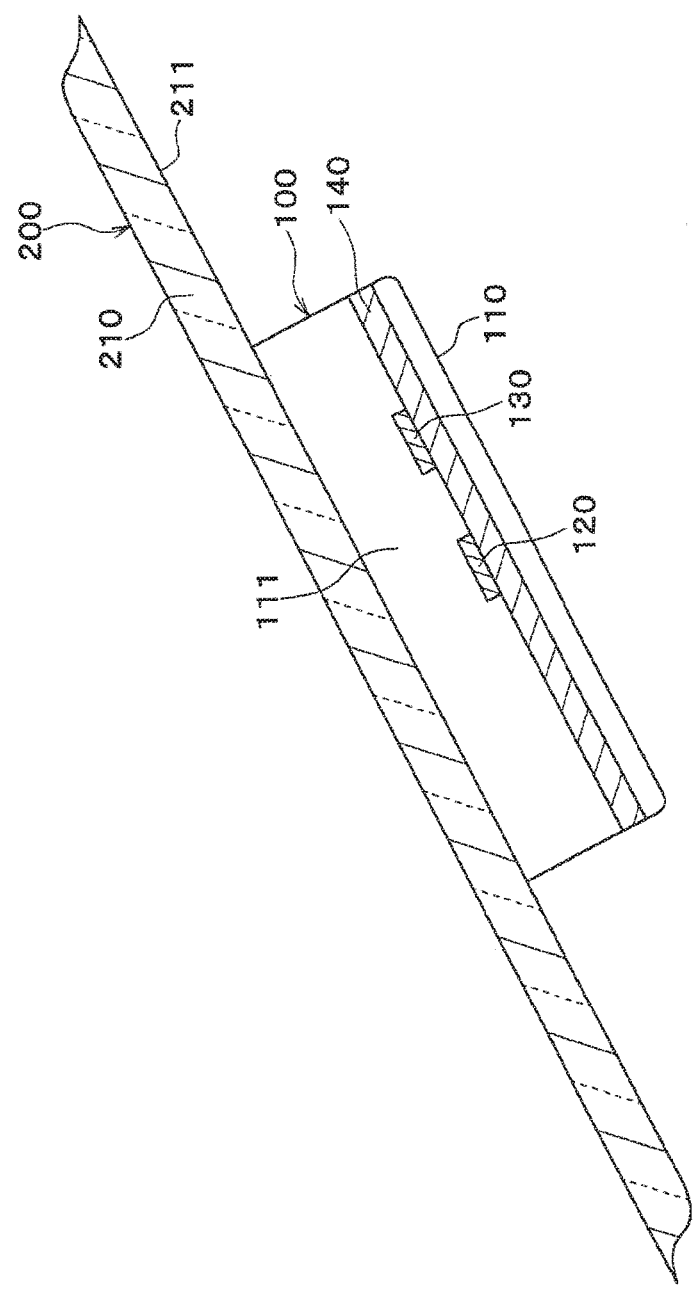
FIG. 1 is a cross-sectional view of an optical sensor according to a first embodiment of the present disclosure, in a state of being attached to a window glass of a vehicle.

Hereinafter, embodiments of the present disclosure will be described with reference to the drawings. In the embodiments described hereinafter, the same or equivalent parts are designated with the same reference numbers in the drawings.

(First Embodiment)

A first embodiment will be described hereinafter with reference to the drawings. An optical sensor according to the present embodiment is, for example, employed to an automatic lighting system that automatically lights on and off headlights and taillights of a vehicle when the vehicle travels under a bridge beam or enters a tunnel in the daytime.

As shown in FIG. 1, an optical sensor 100 includes a case 110, an IC chip 120, a microcomputer 130, and a circuit board 140.

The case 110 is a housing having a bottomed tubular shape, and accommodates the IC chip 120, the microcomputer 130, the circuit board 140 and the like therein. The case 110 is made of a metal material or a resin material. The case 110 is attached to an inner surface 211 of a window glass 210 of a vehicle 200 such that a space 111 is provided between the case 110 and the inner surface 211 of the window glass 210. Thus, components such as the circuit board 140 are disposed adjacent to the inner surface 211 of the window glass 210. Note that, in the present embodiment, the window glass 210 is a windshield.

Figure 2:
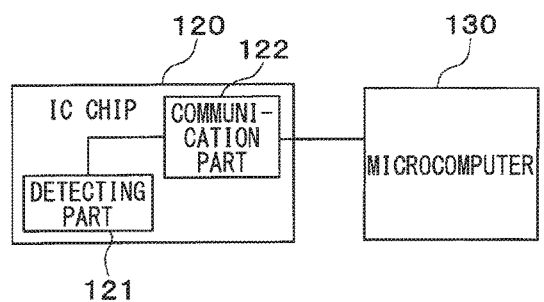
FIG. 2 is a block diagram illustrating an IC chip and a microcomputer.
Figure 3:
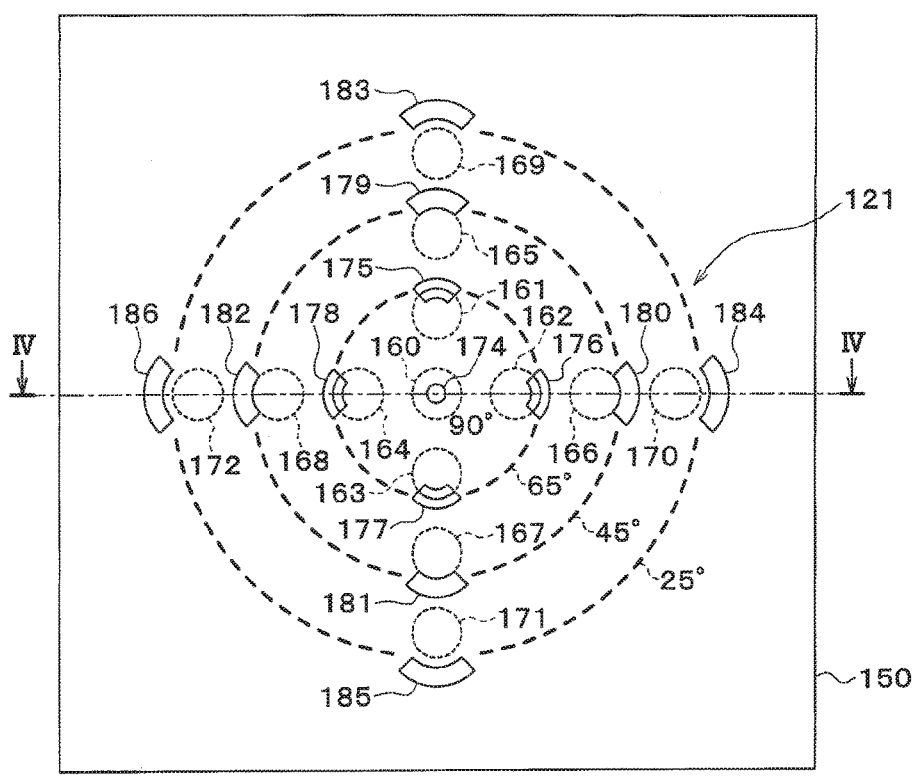
FIG. 3 is a plan view of the IC chip.
Figure 4:
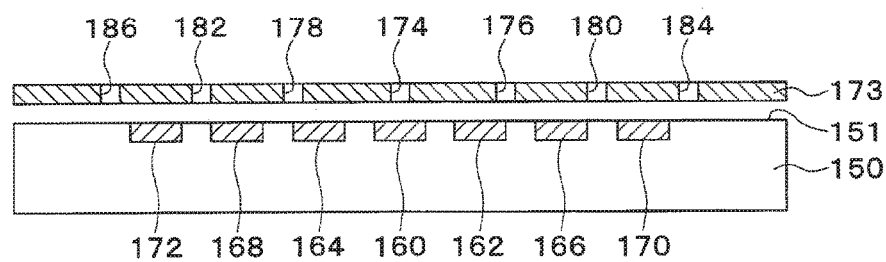
FIG. 4 is a cross-sectional view taken along a line IV-IV in FIG. 3.

As shown in FIG. 2, the IC chip 120 has a detecting part 121 and a communication part 122. The detecting part 121 is a sensing section that senses the light outside of the vehicle. As shown in FIGS. 3 and 4, the detecting part 121 includes a semiconductor substrate 150, a plurality of detecting elements 160 to 172, and a light-shielding plate 173.

The detecting elements 160 to 172 are photodetectors that detects a light incident onto the space 111 of the case 110 through the window glass 210. Specifically, each of the photodetectors is a photodiode that detects an intensity of light received. For example, each of the detecting elements 160 to 172 is provided by a P-type ion implanted region formed in an N-type semiconductor substrate 150 adjacent to the surface 151.

Each of the detecting elements 160 to 172 is connected to an anode electrode, which is not illustrated. The semiconductor substrate 150 is connected to a cathode electrode, which is not illustrated. Therefore, each of the detecting elements 160 to 172 detects the intensity of light received as a voltage between the anode and the cathode, and outputs the voltage as a detection signal. In the present embodiment, twelve detecting elements 161 to 172 are arranged in the shape of cross centering on one detecting element 160.

The light-shielding plate 173 is disposed above the semiconductor substrate 150. The light-shielding plate 173 has through holes 174 to 186 that are correspondingly provided for the detecting elements 160 to 172. Of the through holes 174 to 196, the through hole 174, which corresponds to the detecting element 160 located at the center of the detecting elements 160 to 172 arranged in the shape of cross, is located right above the detecting element 160. Thus, the detecting element 160 selectively receives a light applied at an angle of 90° that is a direction perpendicular to the surface 151 of the semiconductor substrate 150. That is, the detecting element 160 selectively receives the light an elevation angle of which relative to the surface 151 of the semiconductor substrate 150 is 90°. Note that, in FIG. 3, of the through holes 174 to 196 of the light-shielding plate 173, only through holes 174 to 186 are illustrated.

The through holes 175 to 178, which respectively correspond to the four detecting elements 161 to 164 located on an outer periphery of the detecting element 160, selectively lead the light the elevation angle of which relative to the surface 151 of the semiconductor substrate 150 is 65° to the corresponding detecting elements 161 to 164. Thus, each of the detecting elements 161 to 164 can selectively receive the light the elevation angle of which relative to the surface 151 of the semiconductor substrate 150 is 65°.

Likewise, the through holes 179 to 182, which respectively correspond to the four detecting elements 165 to 168 located on an outer periphery of the four detecting elements 161 to 164, selectively lead the light the elevation angle of which relative to the surface 151 of the semiconductor substrate 150 is 45° to the corresponding detecting elements 165 to 168. Thus, each of the detecting elements 165 to 168 can selectively receive the light the elevation angle of which relative to the surface 151 of the semiconductor substrate 150 is 45°.

The through holes 183 to 186, which respectively correspond to the four detecting elements 169 to 172 located on an outer periphery of the four detecting elements 165 to 168, selectively lead the light the elevation angle of which relative to the surface 151 of the semiconductor substrate 150 is 25° to the corresponding detecting elements 169 to 172. Thus, each of the detecting elements 169 to 172 can selectively receive the light the elevation angle of which relative to the surface 151 of the semiconductor substrate 150 is 25°.

As described above, since the light-shielding plate 173 is formed with the through holes 174 to 186, the detecting elements 160 to 172 receive lights coming from different directions. In other words, the light-shielding plate 173 provides the directional characteristics of light to the detecting elements 160 to 172 such that the intensity of light received from the specified direction is different between the detecting elements 160 to 172.

Figure 5:
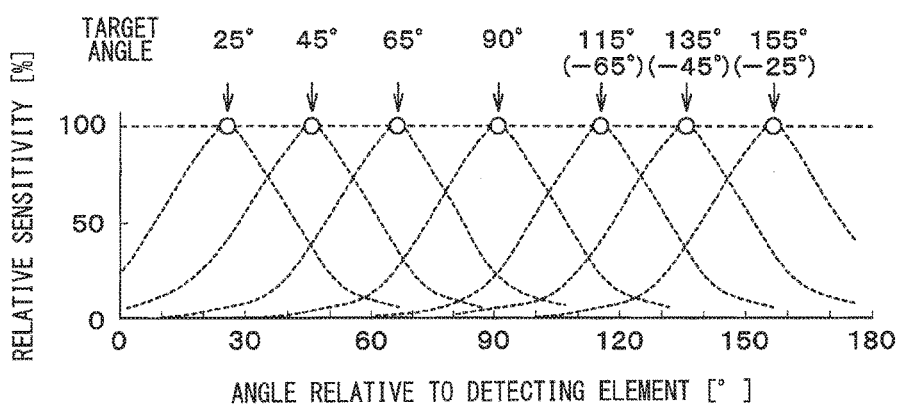
FIG. 5 is a diagram illustrating directional characteristics of light of each detecting element.

The detecting elements 160 to 172 have different directional characteristics of light. Therefore, as shown in FIG. 5, peaks of relative sensitivities of the detecting elements 160 to 172 are aligned next to each other in the range of elevation angle from 0° to 180°. In other words, since the peaks of the light receiving sensitivity of the detecting elements 160 to 172 are different little by little in the range of elevation angle from 0° to 180°, even if the position of the semiconductor substrate 150 is tilted, the detecting unit 121 can detect the light by any of the detecting elements 160 to 172.

The communication part 122 shown in FIG. 2 is a circuit that analog-to-digital converts the detection signals of the detecting elements 160 to 172 output from the detecting part 121, and provides the converted signals to the microcomputer 130. The communication part 122 is formed in the semiconductor substrate 150.

The microcomputer 130 has CUP, ROM, RAM and the like, which are not illustrated, and is a control circuit that performs signal processing in accordance with a program stored in the ROM or the like. That is, the microcomputer 130 receives the detection signals from the detecting part 121 of the IC chip 120 through the communication part 122, and processes the detection signals received.

The microcomputer 130 processes signals using an adjustment value stored in the ROM. The adjustment value has been set based on information of an inclination angle of the window glass 210 of the vehicle 200 to which the optical sensor 100 is attached.

Although it will be described later in detail, the adjustment value is set in the following manner. Firstly, based on the information of the inclination angle of the window glass 210 to which the optical sensor 100 is attached, the detecting element having the directional characteristic of light suitable for the inclination angle of the window glass 210 is selected from the detecting elements 160 to 172. Then, the adjustment value is adjusted so as to coincide the signal value of the detection signal of the selected detecting element with a target value, when the detecting part 121 is applied with light in a predetermined direction in the state where the detecting part 121 is inclined at the inclination angle. Thus, the adjustment value is a parameter for adjusting the sensitivity relative to the signal value of the detection signal.

Therefore, although the microcomputer 130 receives the detection signals of all of the detecting elements 160 to 172, the microcomputer 130 processes the detection signal of the detecting element that has been selected beforehand, using the adjustment value. The microcomputer 130 outputs the detection signal processed to an electronic control unit (ECU) of an automatic lighting system.

The circuit board 140 shown in FIG. 1 has the IC chip 120 and the microcomputer 130 thereon. In addition to the IC chip 120 and the microcomputer 130, the circuit board 140 has other electronic components, though not illustrated. The circuit board 140 is fixed inside of the case 110. An overall structure of the optical sensor 100 of the present embodiment is as described hereinabove.

Next, a manufacturing method of the optical sensor 100 will be described. Firstly, the IC chip 120 on which the plurality of detecting elements 160 to 172 have been formed is prepared. The IC chip 120, the microcomputer 130 and the other electronic components are mounted on the circuit board 140. The circuit board 140 is installed in the case 110.

Figure 6:
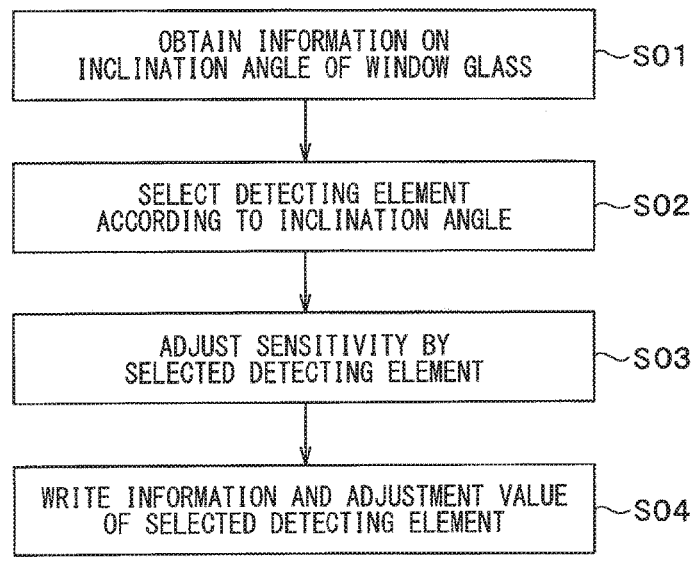
FIG. 6 is a diagram illustrating a manufacturing process for obtaining an adjustment value.
Figure 7:
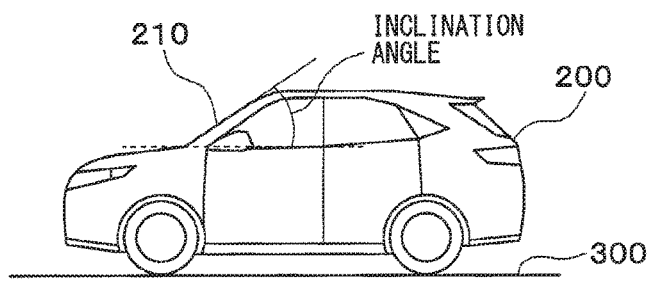
FIG. 7 is a diagram for explaining an inclination angle of a window glass of a vehicle.

Next, the adjustment value is obtained according to the process shown in FIG. 6. Firstly, the information of the inclination angle of the window glass 210 to which the optical sensor 100 is fixed is obtained (obtaining step, S01). As shown in FIG. 7, the inclination angle of the window glass 210 of the vehicle 200 is an angle defined between the ground 300 and the windshield as the window glass 210.

Figure 8:
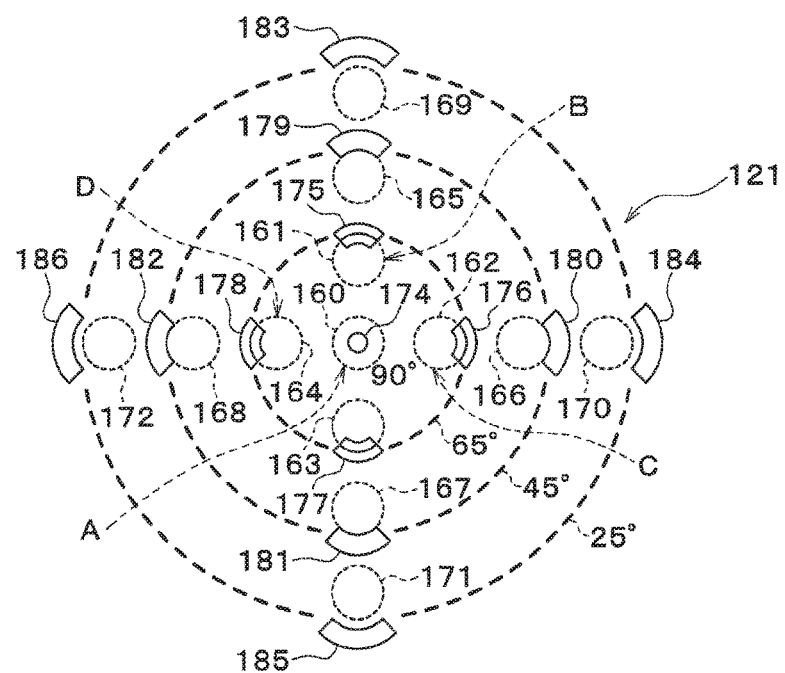
FIG. 8 is a diagram illustrating detecting elements selected according to an inclination angle of a window glass.

Thereafter, based on the information of the inclination angle of the window glass 210, the detecting element having the directional characteristics of light suitable for the inclination angle is selected from the detecting elements 160 to 172 (selecting step, S02). For example, as shown in FIG. 8, four detecting elements, such as the detecting element 160 (A), the detecting element 161 (B), the detecting element 162 (C), and the detecting element 164 (D) are selected.

Next, the adjustment value is set (adjusting step, S03). Firstly, light is applied to the detecting unit 121 in the predetermined direction in the state where the optical sensor 100 is inclined at the inclination angle of the window glass 210. In this case, a dedicated device that can fix the optical sensor 100 at a desired inclination angle and can apply light toward the optical sensor 100 in a predetermined direction is used.

Figure 9:
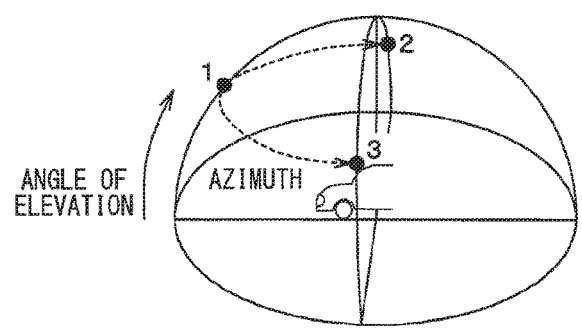
FIG. 9 is a diagram illustrating applying directions of light, when the light is applied to an optical sensor in a predetermined direction in an adjusting step.

The predetermined direction includes three directions, such as (1) elevation angle of 40° and azimuth of 0°, (2) elevation angle of 40° and azimuth of +90°, and (3) elevation angle of 40° and azimuth of −90°, as shown in FIG. 9. The predetermined angle is determined according to the inclination angle of the window glass 210. In the present embodiment, the predetermined angle is determined as described above.

Figures 10, 11:
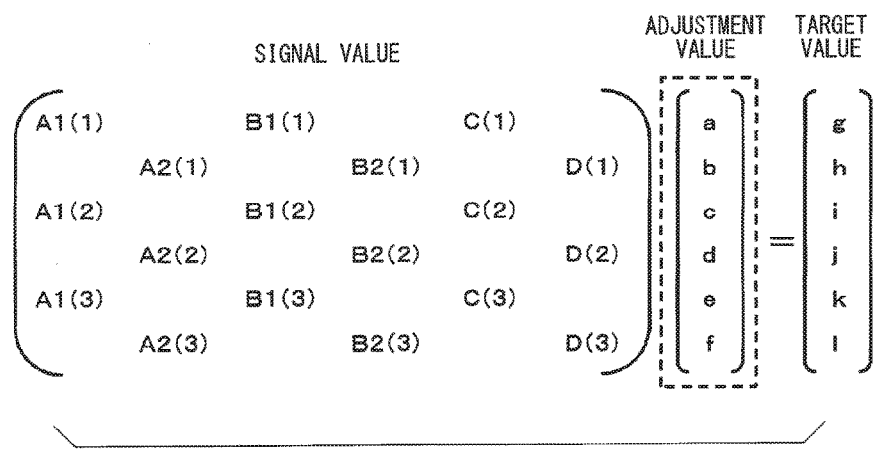
FIG. 10 is a diagram illustrating signal values of selected detecting elements in the adjusting step.
FIG. 11 is a diagram illustrating a simultaneous equation for calculating an adjustment value in the adjusting step.

The light is applied to the detecting part 121 in each of the three directions, and the signal values of the detection signals of the detecting elements 160 to 172 selected in the selecting step are obtained. As shown in FIG. 10, six signal values are obtained per one direction. That is, eighteen signal values are obtained for three directions.

In this case, two values A1 and A2 are obtained for the detecting element 160 (A) in order to output the detection signal of the light applied from the right side of the vehicle 200 with respect to the vehicle travelling direction as a right detection signal and the detection signal of the light applied from the left side of the vehicle 200 with respect to the vehicle travelling direction as a left detection signal. Likewise, two values B1 and B2 are obtained for the detecting element 161 (B) in order to output the detection signal as the right-side output of the vehicle 200 and the detection signal as the left-side output of the vehicle 200.

Next, the adjustment values are calculated such that the signal values of the detecting elements 160 to 172 selected in the selecting step coincide with the target values. Specifically, as shown in FIG. 11, simultaneous equations are formulated in such a manner that the signal values obtained are equalized to the target values (g to l) by the adjustment values. In this case, the signal values and the target values (g to l) are known values. Therefore, the adjustment values (a to f) can be obtained by solving the simultaneous equations.

As described above, since the adjustment values relative to the inclination angle of the window glass 210 are obtained, the adjustment values can be utilized for all the optical sensors 100 used at this inclination angle. That is, after the adjustment values are obtained once, it is not necessary to obtain the adjustment values for each of the optical sensors 100.

Thereafter, the information of the detecting elements 160 to 172 selected by the selecting step and the adjustment values obtained by the adjusting step are received from the dedicated device and stored in the ROM of the microcomputer 130, which is a memory unit of the microcomputer 130 (storing step, S04). In this way, the optical sensor 100 is completed.

As described above, after the adjustment values are obtained once, it is not necessary to perform the above steps for an individual optical sensor 100. Therefore, it is possible to write the adjustment values to the microcomputer 130 before the microcomputer 130 is mounted on the circuit board 140, for example.

The automatic lighting system operates in the following manner. Firstly, the detecting part 121 provides the detection signals to the microcomputer 130 as required. The microcomputer 130 processes, of the detection signals, the detection signals of the detecting elements that are selected beforehand with the adjustment values, and outputs the detection signals of the right output and the left output to the electronic control unit (ECU). The electronic control unit compares the detection signals of the right output and the left output with a lighting threshold, and turns on or off the lightings of the vehicle 200 based on the comparison results.

Thus, the lightings can be automatically turned on or off, for example, when the vehicle 200 travels in a tunnel.

As described above, in the present embodiment, the detecting elements 160 to 172 are provided with different directional characteristics of light by the light-shielding plate 173 in the detecting part 121. Therefore, the detection signals of the detecting elements that are suitable for the inclination angle of the window glass 210 can be selectively used. Further, the optimum adjustment values can be obtained beforehand based on the information of the inclination angle of the window glass 210. Accordingly, the optical sensor 100 that is suitable for the inclination angle of the window glass 210 can be made.

The optical sensor 100 is employed to the automatic lighting system. It is less likely that the automatic lighting operation based on the output of the optical sensor 100 will cause discomfort to the user. That is, it is less likely that the feelings of user will be different in vehicles having different inclination angles of the window glass 210.

Note that the light-shielding plate 173 corresponds to a light-shielding part, and the microcomputer 130 corresponds to a signal processing part.

(Second Embodiment)

In the present embodiment described hereinafter, portions different from the first embodiment will be described. In the present embodiment, the optical sensor 100 is employed to a raindrop detection device that detects raindrops adhering to the window glass 210 of the vehicle 200. In this case, the detection signal of the optical sensor 100 is used for determining whether raindrops are adhering to the window glass 210.

(Other Embodiments)

The structures of the optical sensor 100 of the embodiments described hereinabove are examples, and are not limited to the structures described hereinabove. The optical sensor 100 may have any other structures as long as the optical sensor 100 can implement the present disclosure. For example, it is not always necessary that the light-shielding portion for setting the directional characteristics of light is provided by the light-shielding plate 173. For example, the light-shielding portion may be provided by a light-shielding film formed on the surface 151 of the semiconductor substrate 150. That is, the light-shielding film at least has light-transmitting portions at portions.

In each of the embodiments described hereinabove, the four detecting elements 160 to 172 that are suitable for the inclination angle of the window glass 210 are selected. However, this configuration is an example. The number of the detecting elements 160 to 172 to be selected is not limited to four. The detecting elements 160 to 172 are arranged in the shape of cross. However, such arrangement is an example. The plurality of detecting elements 160 to 172 may be arranged in any manner. Furthermore, the directional characteristics of light indicated in FIG. 5 are an example. The peaks of the sensitivity may be suitably set to any angles (elevation angles).

In the embodiment described hereinabove, the adjustment values are obtained by solving the simultaneous equations shown in FIG. 11. However, such a method of obtaining the adjustment values is an example. The adjustment values may be obtained by any other methods.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An optical sensor comprising:
a detector that includes a plurality of photodetectors each being disposed on a semiconductor substrate and outputting an intensity of light received as a detection signal, and a light shield providing directional characteristics of light to the plurality of photodetectors such that the plurality of photodetectors indicate different intensities for a light applied in a specified direction; and
a signal processor that receives the detection signals from the detector and processes the detection signals using an adjustment value set beforehand, wherein
the adjustment value is set so as to coincide a signal value of a detection signal of a selected photodetector, when the detector is applied with a light in a predetermined direction in a state where the detector is inclined at an inclination angle, with a target value, the selected photodetector being selected from among the plurality of photodetectors without selecting all of the plurality of photodetectors based on information of the inclination angle and having the directional characteristic of light suitable for the inclination angle, the inclination angle being an inclination angle of a window glass of a vehicle to which the detector is attached, and
the signal processor processes, among the detection signals received from the detector, the detection signal of the selected photodetector using the adjustment value.

2. The optical sensor according to claim 1, wherein the optical sensor is employed to an automatic lighting system for automatically turning on a lighting of the vehicle.

3. The optical sensor according to claim 1, wherein the optical sensor is employed to a raindrop detecting device that detects raindrops adhering to the window glass of the vehicle.

4. A method for setting an optical sensor, the optical sensor including: a detector that has a plurality of photodetectors disposed on a semiconductor substrate and outputting intensities of light received as detection signals, and a light shield providing directional characteristics of light to the detecting elements such that the plurality of photodetectors indicate different intensities for a light received in a specified direction; and a signal processor that receives the detection signals from the detector and processes the detection signals using an adjustment value that is set beforehand, the method comprising:
obtaining information of an inclination angle of a window glass of a vehicle to which the detector is attached;
selecting, from among the plurality of photodetectors without selecting all of the plurality of photodetectors, a photodetector having a directional characteristic of light suitable for the inclination angle based on the information of the inclination angle;
setting the adjustment value so as to coincide a signal value of a detection signal of the photodetector selected by the selecting, when the detector is irradiated with light in a predetermined direction in a state where the detector is inclined at the inclination angle, with a target value; and
storing information of the photodetector selected by the selecting and the adjustment value set by the setting to the signal processor.

5. The method for setting the optical sensor according to claim 4, wherein the optical sensor is employed to an automatic lighting system for automatically turning on a lighting of the vehicle.

6. The method for setting the optical sensor according to claim 4, wherein the optical sensor is employed to a raindrop detecting device that detects raindrops adhering to the window glass of the vehicle.

* * * * *